(12) United States Patent
Liao et al.

(10) Patent No.: US 9,625,955 B2
(45) Date of Patent: Apr. 18, 2017

(54) ELECTRONIC DEVICE WITH FLEXIBLE ASSEMBLY AND LIMIT STRUCTURE THEREOF

(71) Applicant: Wistron Corporation, New Taipei (TW)

(72) Inventors: Ping-Feng Liao, New Taipei (TW); Hsing-Wang Chang, New Taipei (TW); Po-Yuan Hsu, New Taipei (TW); Tsung-Hsien Chen, New Taipei (TW); Chia-Cheng Su, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 160 days.

(21) Appl. No.: 14/599,631

(22) Filed: Jan. 19, 2015

(65) Prior Publication Data

US 2016/0018855 A1 Jan. 21, 2016

(30) Foreign Application Priority Data

Jul. 17, 2014 (TW) .............................. 103124568 A (51) Int. Cl.
*G06F 1/16* (2006.01)

(52) U.S. Cl.
CPC .......... *G06F 1/1681* (2013.01); *G06F 1/1616* (2013.01); *G06F 1/1641* (2013.01);
(Continued)

(58) Field of Classification Search
CPC ..... G06F 1/1681; G06F 1/1641; G06F 1/1652
See application file for complete search history.

(56) References Cited

U.S. PATENT DOCUMENTS

| 8,711,566 B2 | 4/2014 | O'Brien |
| 9,317,067 B2 * | 4/2016 | Choi ................. G06F 1/1641 |

(Continued)

FOREIGN PATENT DOCUMENTS

| TW | M395340 U1 | 12/2010 |
| TW | M433314 U1 | 7/2012 |

(Continued)

OTHER PUBLICATIONS

Partial English translation of TW201417068 (Published May 1, 2014).

(Continued)

*Primary Examiner* — Hoa C Nguyen
*Assistant Examiner* — Keith Depew
(74) *Attorney, Agent, or Firm* — McClure, Qualey & Rodack, LLP (57) ABSTRACT

An electronic device with a flexible assembly, comprising a housing, a positioning assembly and a flexible display, is provided. The housing comprises a first cover plate, a second cover plate and a flexible assembly. The flexible assembly is bendably connected to the first and second cover plates, so that the first cover plate closes on the second cover plate or opens to a limit angle with respect to the second cover plate and then stops. The positioning assembly is disposed on the housing for positioning the first cover plate, the flexible assembly and the second cover plate in an open state or a closed state. When the first cover plate opens to the limit angle with respect to the second cover plate, the positioning assembly prevents the first cover plate from rotating in a reverse direction with respect to the second cover plate.

19 Claims, 6 Drawing Sheets

(52) U.S. Cl.
CPC ...... *G06F 1/1652* (2013.01); *E05Y 2900/606* (2013.01); *G06F 2200/1633* (2013.01)

(56) References Cited

U.S. PATENT DOCUMENTS

| | | | |
|---|---|---|---|
| 2007/0097014 A1* | 5/2007 | Solomon | G06F 1/1616 345/1.1 |
| 2007/0285341 A1* | 12/2007 | Manning | G06F 1/1616 345/1.3 |
| 2008/0158795 A1* | 7/2008 | Aoki | G06F 1/1616 361/679.27 |
| 2011/0286157 A1* | 11/2011 | Ma | G06F 1/1652 361/679.01 |
| 2012/0008267 A1* | 1/2012 | Watanabe | G02F 1/133305 361/679.01 |
| 2012/0307423 A1 | 12/2012 | Bohn et al. | |
| 2012/0314399 A1 | 12/2012 | Bohn et al. | |
| 2013/0010405 A1* | 1/2013 | Rothkopf | H04M 1/0216 361/679.01 |
| 2013/0021762 A1* | 1/2013 | van Dijk | G06F 1/1652 361/749 |
| 2013/0314611 A1* | 11/2013 | Okutsu | H04N 5/64 348/739 |
| 2013/0342094 A1* | 12/2013 | Walters | G09F 19/00 312/319.2 |
| 2014/0111954 A1* | 4/2014 | Lee | G06F 1/1641 361/749 |
| 2014/0123436 A1* | 5/2014 | Griffin | H04M 1/0216 16/221 |
| 2014/0126121 A1* | 5/2014 | Griffin | H04M 1/0216 361/679.01 |
| 2014/0126133 A1* | 5/2014 | Griffin | G06F 1/1652 361/679.27 |
| 2014/0340856 A1* | 11/2014 | Yeo | H05K 1/0281 361/749 |
| 2014/0375530 A1* | 12/2014 | Delaporte | G06F 1/1616 345/1.3 |
| 2015/0138103 A1* | 5/2015 | Nishi | G02F 1/13452 345/173 |
| 2015/0153780 A1* | 6/2015 | Maatta | G06F 1/1656 361/679.27 |
| 2015/0185782 A1* | 7/2015 | Kim | G06F 1/1652 349/12 |
| 2015/0241925 A1* | 8/2015 | Seo | G06F 1/1652 361/679.27 |
| 2015/0255023 A1* | 9/2015 | Lee | G09G 3/36 345/204 |
| 2015/0257289 A1* | 9/2015 | Lee | H05K 5/0017 361/749 |
| 2015/0257290 A1* | 9/2015 | Lee | H05K 5/0017 361/749 |
| 2015/0361696 A1* | 12/2015 | Tazbaz | H04M 1/022 361/679.27 |
| 2015/0366089 A1* | 12/2015 | Park | G06F 1/1652 361/679.01 |
| 2015/0378397 A1* | 12/2015 | Park | G06F 1/1652 361/679.27 |
| 2016/0224238 A1* | 8/2016 | Rothkopf | G06F 3/04883 345/173 |

FOREIGN PATENT DOCUMENTS

| | | |
|---|---|---|
| TW | I402659 | 7/2013 |
| TW | 201417068 A | 5/2014 |
| TW | 201421208 A | 6/2014 |
| WO | 2014057241 A1 | 4/2014 |

OTHER PUBLICATIONS

Partial English translation of TWM395340 (Published Dec. 21, 2010).
Partial English translation of TWM433314 (Published Jul. 11, 2012).
TW Office Action dated Aug. 7, 2015 in corresponding Taiwan application (No. 103124568).
Partial English translation of TW Office Action dated Aug. 7, 2015 in corresponding Taiwan application (No. 103124568).

* cited by examiner

ELECTRONIC DEVICE WITH FLEXIBLE ASSEMBLY AND LIMIT STRUCTURE THEREOF

This application claims the benefit of Taiwan application Serial No. 103124568, filed Jul. 17, 2014, the subject matter of which is incorporated therein by reference.

BACKGROUND OF THE INVENTION

Field of the Disclosure

The disclosure relates in general to an electronic device, and more particularly to an electronic device with a flexible assembly and a limit structure thereof.

Description of the Related Art

Along with the popularity of technology, all sorts of 3C electronic products are provided, and people can select different types of electronic products according to their personal preferences. Moreover, under the current trend pursuing after high resolution and specific lighting and visual effects, large-sized display screen has become a mainstream product providing a larger reading horizon. Although conventional small-sized electronic device has the advantages of smaller volume, lighter weight and better portability, the display screen of the conventional small-sized electronic device is too small and does not meet the requirements of reading. Therefore, it has become a popular phenomenon that a user possesses both a large-sized tablet PC and a small-sized smartphone.

However, the convenience of portability will be jeopardized if the user has to carry several electronic devices at the same time or has to carry a large-sized tablet PC. Moreover, since different electronic devices may have different operating interfaces, batteries or storage devices, more problems in respect of data management and storage would arise.

SUMMARY OF THE INVENTION

The disclosure is directed to an electronic device with a flexible assembly and a limit structure thereof for providing a dual-mode electronic device and a limit structure for opening or closing the electronic device.

According to one embodiment of the disclosure, an electronic device with a flexible assembly is provided. The electronic device comprises a housing, a positioning assembly and a flexible display. The housing comprises a first cover plate, a second cover plate and a flexible assembly. The flexible assembly is bendably connected to the first cover plate and the second cover plate, so that the first cover plate closes on the second cover plate or opens to a limit angle with respect to the second cover plate and then stops. The positioning assembly is disposed on the housing for positioning the first cover plate, the flexible assembly and the second cover plate in an open state or a closed state. When the first cover plate opens to the limit angle with respect to the second cover plate, the positioning assembly prevents the first cover plate from rotating in a reverse direction with respect to the second cover plate. The flexible display is expandably or foldablely disposed on the first cover plate, the flexible assembly and the second cover plate.

According to another embodiment of the disclosure, a limit structure used in a housing is provided. The housing comprises a first cover plate and a second cover plate. The limit structure comprises a flexible assembly and a positioning assembly. The flexible assembly is bendably connected to the first cover plate and the second cover plate, so that the first cover plate closes on the second cover plate or opens to a limit angle with respect to the second cover plate and then stops. When each component of the flexible assembly rotates to a stop position in the same direction, the flexible assembly limits the continuous rotation of the first cover plate with respect to the second cover plate. The positioning assembly is disposed on the housing for positioning the first cover plate, the flexible assembly and the second cover plate in an open state or a closed state. When the first cover plate opens to the limit angle, the positioning assembly prevents the first cover plate from rotating in a reverse direction with respect to the second cover plate.

The above and other aspects of the disclosure will become better understood with regard to the following detailed description of the preferred but non-limiting embodiment(s). The following description is made with reference to the accompanying drawings.

DETAILED DESCRIPTION OF THE INVENTION

A number of embodiments are disclosed below with accompanying drawings for elaborating the disclosure. However, the embodiments of the disclosure are for detailed descriptions only, not for limiting the scope of protection of the disclosure.

Figure 1A:
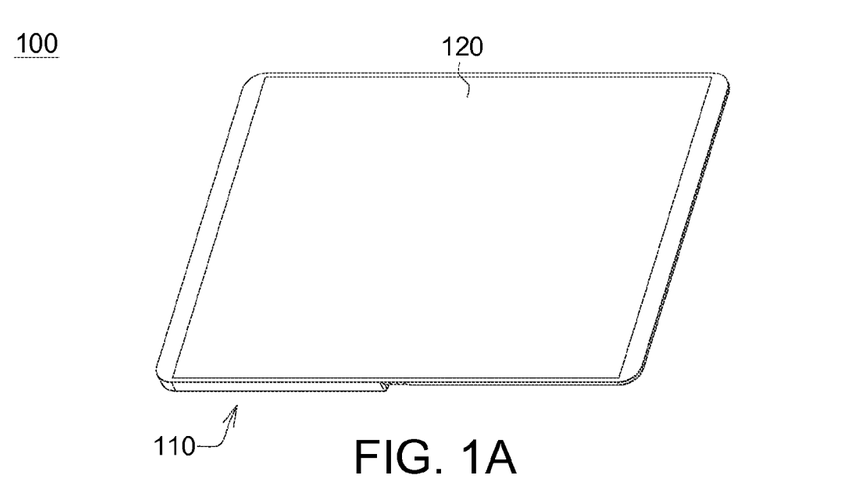
FIG. 1A is a schematic diagram of an open electronic device according to an embodiment of the disclosure.
Figure 1B:
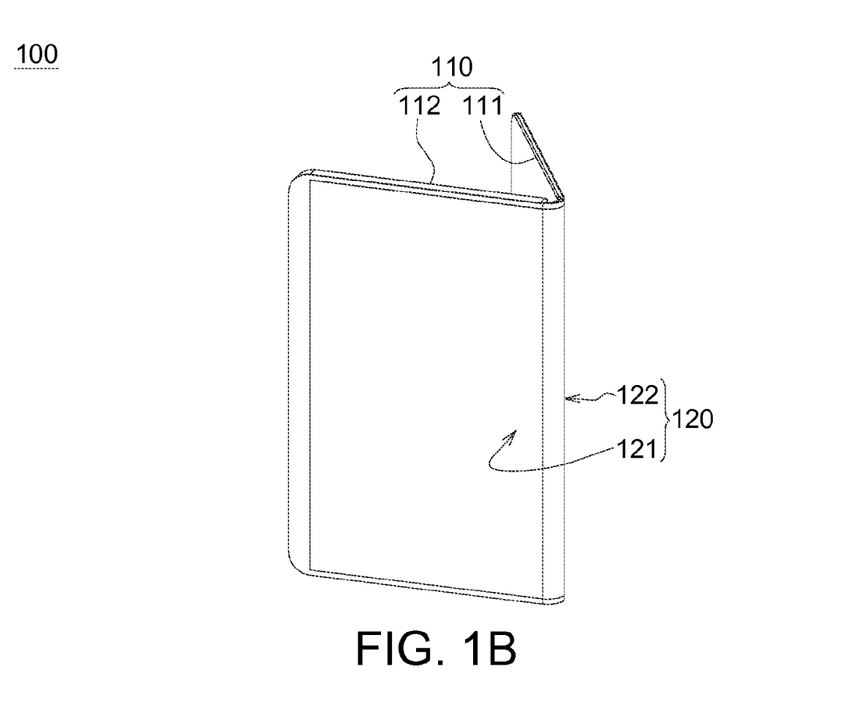
FIG. 1B is a schematic diagram of a half-closed electronic device.

Please refer to FIG. 1A and FIG. 1B. FIG. 1A is a schematic diagram of an open electronic device 100 according to an embodiment of the disclosure. FIG. 1B is a schematic diagram of a half-closed electronic device 100. The electronic device 100 comprises a housing 110 and a flexible display 120. The electronic device 100 can be realized by a handheld tablet PC, a mobile phone or other multi-media device. The flexible display 120 can be realized by a flexible liquid crystal display (LCD) or a flexible organic light emitting diode (OLED) display. The flexible LCD uses a backlight module (not illustrated) as its light source. The flexible OLED display is self-luminous and does not need to use any backlight module as its light source.

In an embodiment, the flexible display 120 is disposed on one side of the housing 110, and can be expanded or folded along with the flexible display 120. As indicated in FIGS. 1A and 1B, when the flexible display 120 expands, the flexible display 120 has a usable area equivalent to the display area in an open state, and can be used as a large-sized planar display screen. Such scenario is referred as tablet PC mode. In addition, when the flexible display 120 expands outwards, the flexible display 120 has two display regions located on two opposite sides (that is, the first display surface 121 and the second display surface 122). The first display surface 121 is corresponding to the first cover plate 111. The second display surface 122 is corresponding to the second cover plate 112. The display area of each display surface is less than a half of the fully expanded display area and is respectively used as a small-sized planar display screen. Such scenario is referred as mobile phone mode. The user can manually switch the electronic device 100 between the tablet PC mode and the mobile phone mode. Or, the system can automatically switch the electronic device 100 between the tablet PC mode and the mobile phone mode by using a built-in sensor.

Figure 2A:
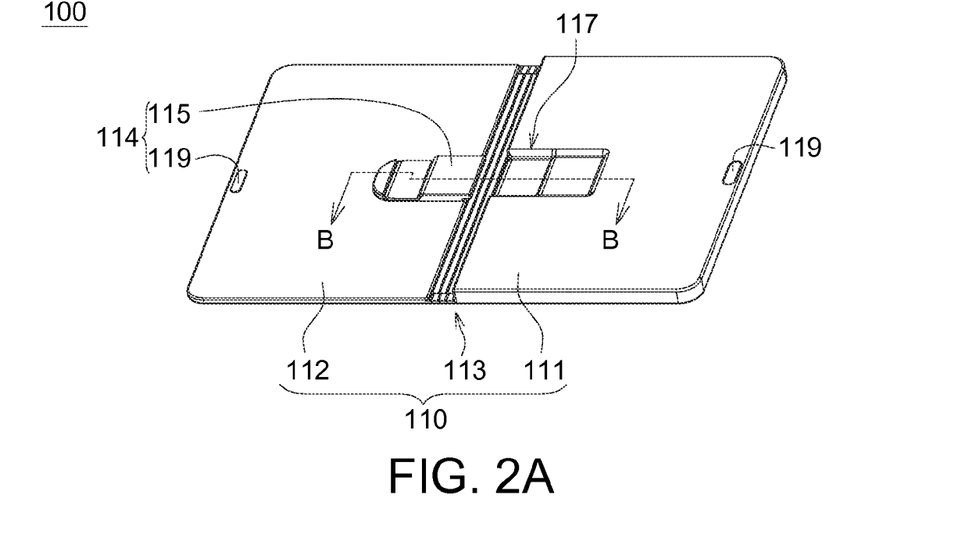
FIGS. 2A and 2B are schematic diagrams of rear views of an electronic device.
Figure 2B:
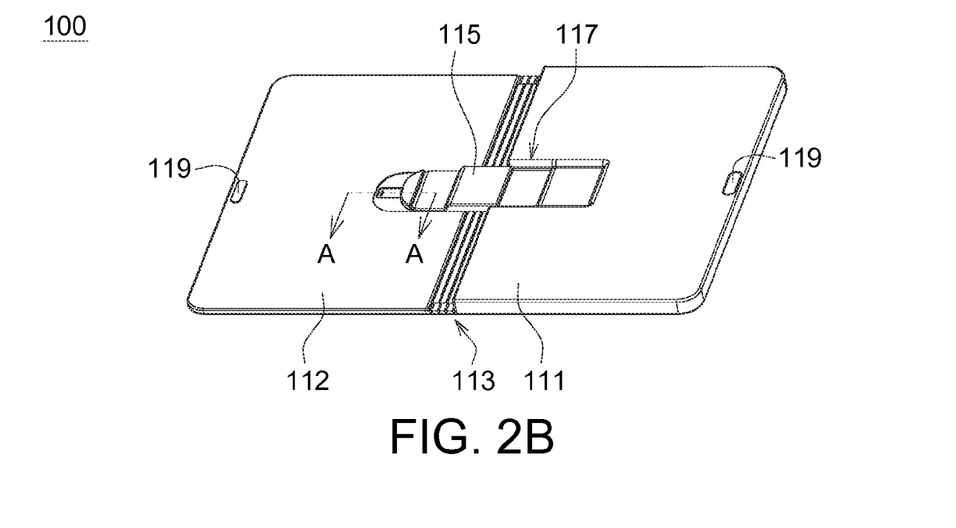
Figure 2C:
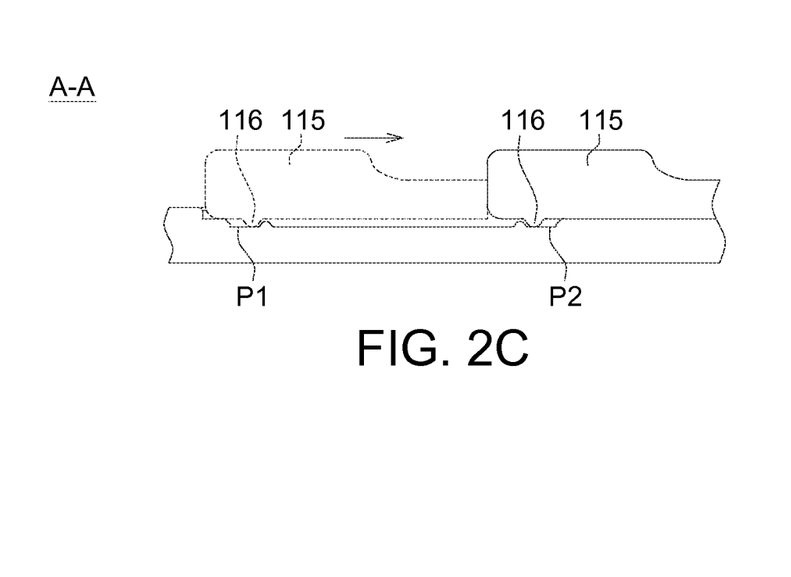
FIG. 2C is a structural cross-sectional view along a cross-sectional line A-A of FIG. 2B.

Refer to FIGS. 2A-2C. FIGS. 2A and 2B are schematic diagrams of rear views of an electronic device 100. FIG. 2C is a structural cross-sectional view along a cross-sectional line A-A of FIG. 2B. The housing 110 comprises a first cover plate 111, a second cover plate 112 and a flexible assembly 113. The flexible assembly 113 is bendably connected to the first cover plate 111 and the second cover plate 112, so that the first cover plate 111 opens with respect to the second cover plate 112 or closes on the second cover plate 112. Besides, the positioning assembly 114 is disposed on the housing 110 for engaging relative positions among the first cover plate 111, the second cover plate 112 and the flexible assembly 113 in the tablet PC mode (the open state) or the mobile phone mode (the closed state).

Specifically, the positioning assembly 114 may comprise a slider 115 and a fastening assembly 119. The slider 115 can be a latch, and the fastening assembly 119 can be a magnetic switch or a reed switch. As indicated in FIGS. 2A and 2B, the fastening assembly 119, disposed on the first cover plate 111 and the second cover plate 112 in pair, engages relative positions among the first cover plate 111, the flexible assembly 113 and the second cover plate 112 in the mobile phone mode. In addition, the first cover plate 111 has a groove 117 opposite to the slider 115. In the mobile phone mode, the slider 115 is received between the first cover plate 111 and the second cover plate 112 through the arrangement of the groove 117.

The slider 115 is disposed on the second cover plate 112. The second cover plate 112 has a first positioning portion P1 and a second positioning portion P2 correspondingly disposed on the movement path of the slider 115. As indicated in FIG. 2C, the first positioning portion P1 and the second positioning portion P2 are two indented portions, the bottom of the slider 115 has a protrusion 116 correspondingly received in the first positioning portion P1 or the second positioning portion P2.

The first positioning portion P1 is disposed relatively farther away from the first cover plate 111 than the second positioning portion P2. The slider 115 may slide between the first positioning portion P1 and the second positioning portion P2 for disengaging or engaging relative positions among the first cover plate 111, the second cover plate 112 and the flexible assembly 113. As indicated in FIG. 2A, when the slider 115 is located on the second cover plate 112 and moved to the first positioning portion P1, the slider 115 does not overlap the first cover plate 111. Therefore, the slider 115 slides in a direction away from the first cover plate 111 to correspondingly disengage relative positions among the first cover plate 111, the second cover plate 112 and the flexible assembly 113 in the open state. As indicated in FIG. 2B, when the slider 115 is moved to the second positioning portion P2, the slider 115 slides towards the first cover plate 111 from the second cover plate 112 and overlaps the first cover plate 111, the second cover plate 112 and the flexible assembly 113. Therefore, the slider 115 is moved to contact with the first cover plate 111 and correspondingly engages relative positions among the first cover plate 111, the second cover plate 112 and the flexible assembly 113 in the open state.

Figure 3A:
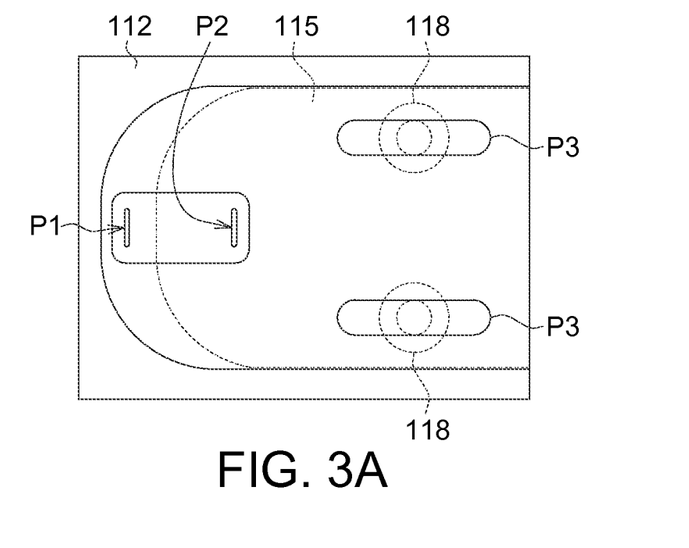
FIG. 3A is a schematic diagram showing the disposition of a slider and a second cover plate.
Figure 3B:
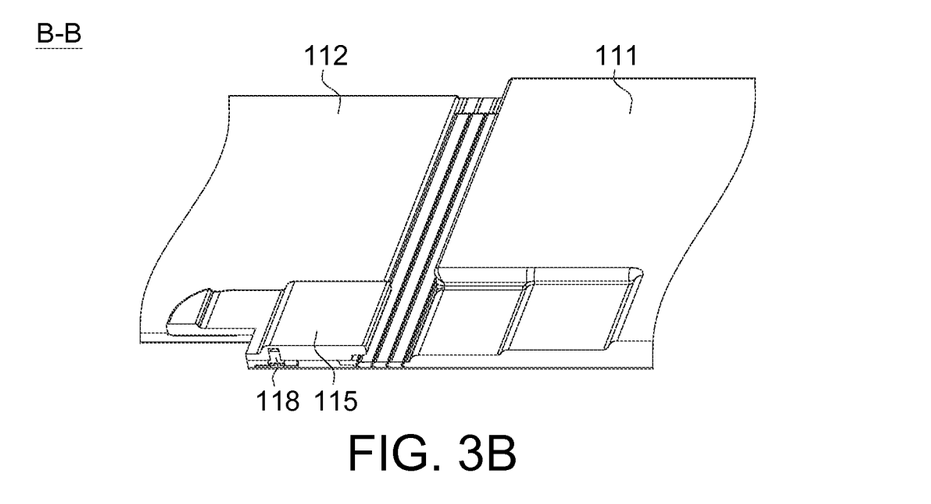
FIG. 3B and FIG. 3C are structural cross-sectional views along a cross-sectional line B-B of FIG. 2A and FIG. 2B respectively.
Figure 3C:
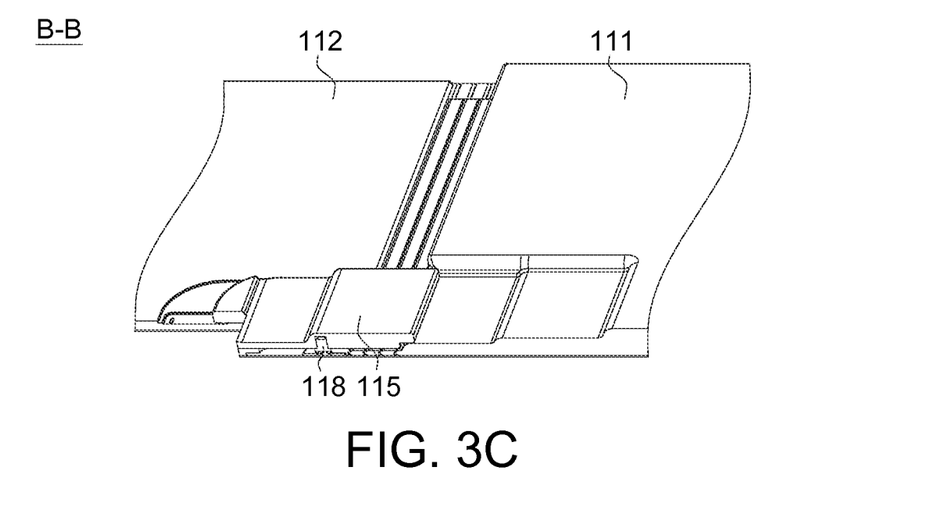

Please refer to FIGS. 3A-3C. FIG. 3A is a schematic diagram showing the disposition of a slider 115 and a second cover plate 112. FIG. 3B and FIG. 3C are structural cross-sectional views along a cross-sectional line B-B of FIG. 2A and FIG. 2B, respectively. To clearly illustrate the structure of components, the slider 115 and the slide blocks 118 of FIG. 3A are illustrated in a perspective mode. As indicated in FIG. 3A, the second cover plate 112 comprises two chutes P3 corresponding to the slider 115. The slider 115 comprises two slide blocks 118 each being located in a corresponding chute P3. As indicated in FIGS. 3B and 3C, each slide block 118 can be realized by a T-shaped structure whose one end passes through the chute P3 and is fixed on the slider 115 and the other end is limited by the chute P3, so that the slider 115 can only slide with respect to the second cover plate 112 along an extending direction of the chute P3. When the slider 115 is moved to the second positioning portion P2 from the first positioning portion P1, each slide block 118 is moved from one end to the other end of the chute P3. Meanwhile, the slider 115 contacts with the first cover plate 111 and correspondingly engages relative positions among the first cover plate 111, the second cover plate 112 and the flexible assembly 113.

In another embodiment, the position of the slide block 118 and that of the chute P3 disclosed above are exchangeable. That is, the slider 115 comprises at least one chute (not illustrated) corresponding to the second cover plate 112. The second cover plate 112 comprises at least one slide block (not illustrated) each being located in a corresponding chute. When the slider 115 is moved to the second positioning portion P2 from the first positioning portion P1, the chute is moved along with the slider 115, so that each slide block is moved from one end to the other end of the chute.

Figure 4A:
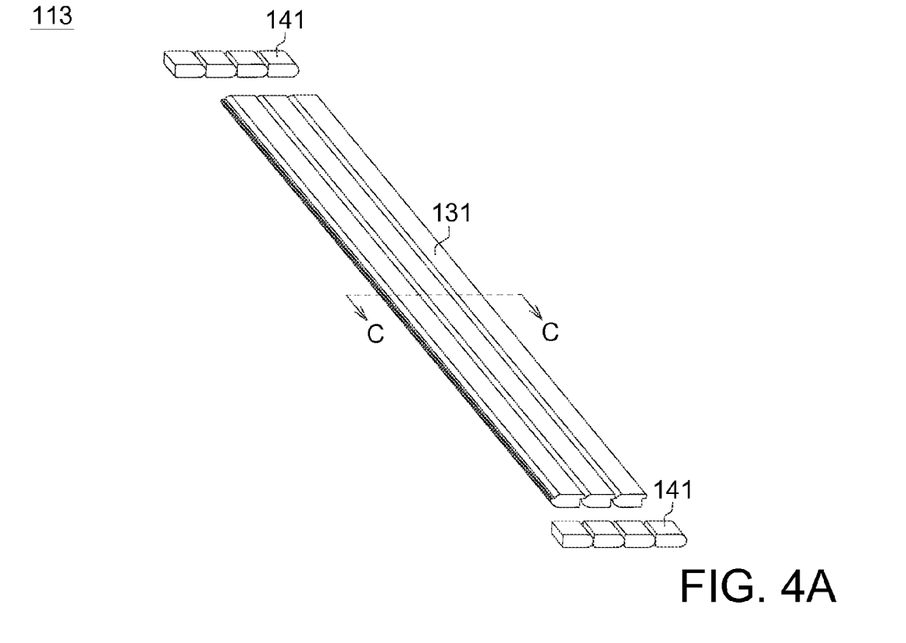
FIG. 4A is a schematic diagram showing the structure of a flexible assembly.
Figure 4B:
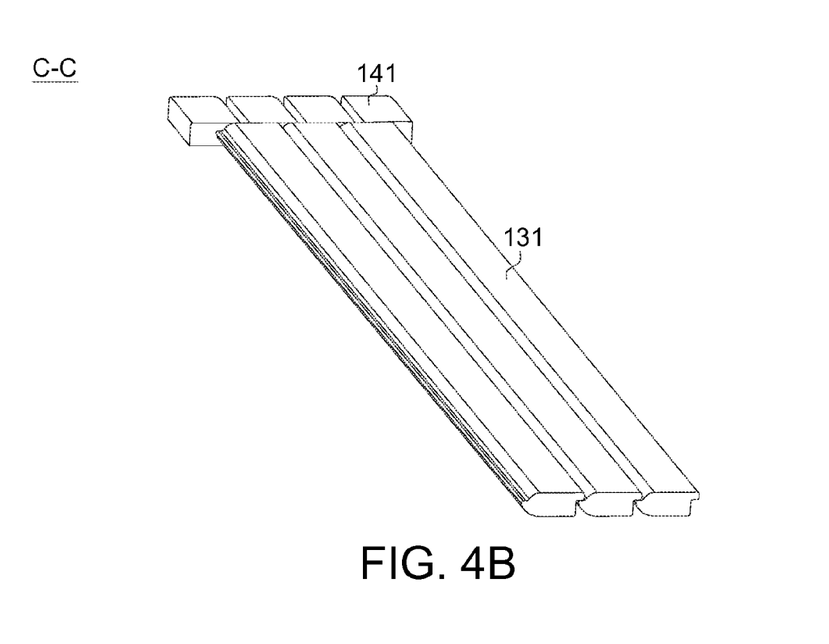
FIG. 4B is a structural cross-sectional view along a cross-sectional line C-C of FIG. 4A.
Figure 4C:
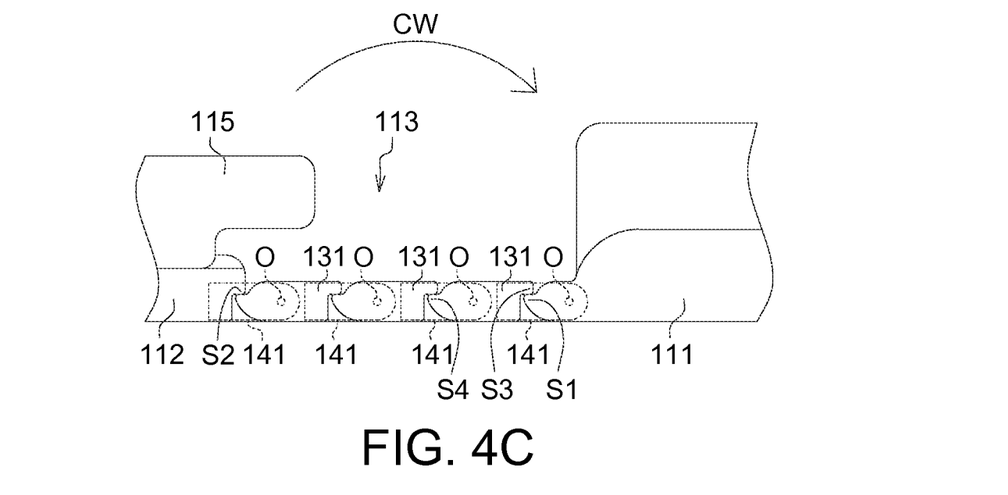
FIG. 4C is a schematic diagram of a flexible assembly connected between a first cover plate and a second cover plate.

Please refer to FIGS. 4A-4C. FIG. 4A is a schematic diagram showing the structure of a flexible assembly 113. FIG. 4B is a structural cross-sectional view along a cross-sectional line C-C of FIG. 4A. FIG. 4C is a schematic diagram of a flexible assembly 113 connected between a first cover plate 111 and a second cover plate 112. The flexible assembly 113 can be realized by a caterpillar track comprising a plurality of track pieces 131 and a plurality of connection members 141. The connection members 141 are arranged in pairs and correspondingly connect the two ends of the track pieces 131, the first cover plate 111 and the second cover plate 112. The quantity of the track pieces 131 is preferably two or more than two. The quantity of the connection members 141 is preferably three pairs or more than three pairs. However, the flexible assembly 113 can also be composed of one track piece 131 and two pairs of connection members 141, and the disclosure does not have specific restrictions regarding the quantities.

As indicated in FIG. 4C, four connection members 141 are respectively pivotally connected between adjacent two of the first cover plate 111, three track pieces 131 and the second cover plate 112. The first connection member 141 is pivotally connected between the first cover plate 111 and the first track piece 131. The second connection member 141 is pivotally connected between the first track piece 131 and the second track piece 131. The third connection member 141 is pivotally connected between the second track piece 131 and the third track piece 131. The fourth connection member 141 is pivotally connected between the third track piece 131 and the second cover plate 112. In addition, the first cover plate 111 and the second cover plate 11 have a first protrusion portion S1 and a second protrusion portion S2 respectively, and two ends of each track piece 131 correspondingly have a third protrusion portion S3 and a fourth protrusion portion S4. The first protrusion portion S1 interferes with the third protrusion portion S3 of the first track piece 131. The second protrusion portion S2 interferes with the fourth protrusion portion S4 of the third track piece 131. The third protrusion portion S3 of the second track piece 131 interferes with the fourth protrusion portion S4 of the first track piece 131 adjacent to the second track piece 131. The third protrusion portion S3 of the third track piece 131 interferes with the fourth protrusion portion S4 of the second track piece 131 adjacent to the third track piece 131. Due to structural restrictions in the flexible assembly 113, the first cover plate 111 can only expand to a limit angle (such as 180°) with respect to the second cover plate 112. Since the protrusion portions will interfere with each other and stop when the angle is over 180°, the first cover plate 111, the flexible assembly 113 and the second cover plate 112 can be substantially coplanar.

That is, the maximum rotation angle of each protrusion portion with respect to respective rotation center O is limited and is, for example, less than or equal to 270°. When the protrusion portions of the components (that is, track pieces 131) are rotated to the stop position in the same direction (for example, rotated clockwise at the same time), the protrusion portions structurally interfere with each other and stop. The said interference will be released as long as the track pieces 131 are rotated in a reverse direction (for example, rotated anticlockwise at the same time). Therefore, in the tablet PC mode, the flexible assembly 113 can limit the positions at which the first cover plate 111 opens to a stop position with respect to the second cover plate 112 in a clockwise direction CW (refer to FIG. 4C). Besides, in the tablet PC mode, to avoid the first cover plate 111 being rotated in a reverse direction and disengaging position limiting, when the slider 115 passes through the flexible assembly 113 and contacts with the first cover plate 111, the first cover plate 111 is incapable of rotating in an anticlockwise direction, so that relative positions among the first cover plate 111, the second cover plate 112 and the flexible assembly are correspondingly engaged. Thus, the positioning assembly 114 can limit the positions at which the first cover plate 111 cannot rotate in a reverse direction after the first cover plate 111 is opened with respect to the second cover plate 112.

Figure 5:
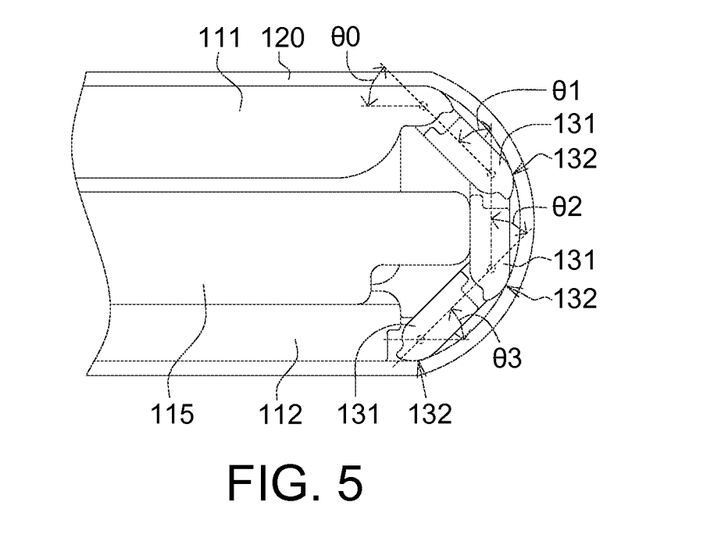
FIG. 5 is a schematic diagram showing a flexible assembly being bent and sustaining at an inner side of a flexible display.

Please refer to FIG. 4C and FIG. 5 at the same time. FIG. 5 is a schematic diagram showing a flexible assembly 113 being bent and sustaining at an inner side of a flexible display 120. When the first cover plate 111 rotates with respect to the second cover plate 112 and folds on the second cover plate 112, each track piece 131 of the flexible assembly 113 is segmentally connected between the first cover plate 111 and the second cover plate 112. The rotation angles of the first cover plate 111 and each track piece 131 with respect to respective rotation center O are basically the same. When the quantity of track pieces 131 is N, rotation angles of the first cover plate 111 and each track piece 131 with respect to respective rotation center O are about $180°/(N+1)$. As indicated in FIG. 5, the rotation angles $\theta_0$, $\theta_1$, $\theta_2$ and $\theta_3$ of the first cover plate 111 and each track piece 131 are about 45°. In another embodiment, the rotation angles $\theta_0$, $\theta_1$, $\theta_2$ and $\theta_3$ can be different.

As indicated in FIG. 5, the flexible assembly 113 is segmentally connected and sustains at an inner side of the flexible display 120 through three track pieces 131, and the outer surface of each track piece 131 has a curvature arc contact surface 132, such that each track piece 131 smoothly contacts the inner side of the flexible display 120 and that the flexible display 120 can pass through the flexible assembly 113 at a near semi-circular curvature radius. In an embodiment, when the flexible assembly 113 has more track pieces 131, for example, from three to five or six, the contact surface between the track pieces 131 and the flexible display 120 will increase, making the curvature radius of the flexible assembly 113 more closer to that of the flexible display 120.

Through the cooperation among the flexible assembly 113, the slider 115 and the fastening assembly 119, the requirements of position limiting can be satisfied. For example, in the tablet PC mode (that is, the open state), the flexible assembly 113 can restrict a limit angle of the first cover plate 111 opening (such as 180°) with respect to the second cover plate 112 to limit the position of the first cover plate 111, the second cover plate 112 and the flexible assembly 113 in the open state. The slider 115 prevents the first cover plate 111 from rotating in a reverse direction to position the flexible assembly 113 between the first cover plate 111 and the second cover plate 112 after the first cover plate 111 opened to the limit angle with respect to the second cover plate 112. Furthermore, in mobile phone mode, the fastening assembly 119 can fix the first cover plate 111 and the second cover plate 112 to limit the position in the closed state.

According to the electronic device with a flexible assembly and the limit structure thereof disclosed in above embodiments of the disclosure, the flexible assembly is bendably connected to the first cover plate and the second cover plate and the positioning assembly slides between the first cover plate and the second cover plate, such that the user can expand or fold the flexible display in the tablet PC mode or the mobile phone mode. In an embodiment, the flexible display can be manually or automatically switched to different use modes and used as a large-sized planar display screen or a small-sized planar display screen. The user can use only one electronic device to achieve two use modes instead of using two electronic devices with different screen sizes. Moreover, the electronic device of the present embodiment can use the same operating interface, the same battery, and the same storage device in two different use modes. Therefore, the electronic device of the present embodiment is more convenient in respect of data management and data storage, and at the same time possesses the advantages of smaller volume, lighter weight, and more convenient storage and portability.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device with a flexible assembly, comprising:

a housing, comprising:
  a first cover plate and a second cover plate;
  a flexible assembly bendably connected to the first cover plate and the second cover plate, so that the first cover plate closes on the second cover plate or opens to a limit angle with respect to the second cover plate and then stops; and
  a positioning assembly disposed on the housing for positioning the first cover plate, the flexible assembly and the second cover plate in an open state or a closed state, wherein when the first cover plate opens to the limit angle with respect to the second cover plate, the positioning assembly comprises a slider engaged with the first cover plate and the second cover plate and crossing over the flexible assembly, so that the positioning assembly prevents the first cover plate from rotating in a reverse direction with respect to the second cover plate; and
  a flexible display expandably or foldablely disposed on the first cover plate, the flexible assembly and the second cover plate.

2. The electronic device according to claim 1, wherein the flexible display has a first display surface and a second display surface corresponding to the first cover plate and the second cover plate, respectively.

3. The electronic device according to claim 1, wherein the slider is slidably disposed on the second cover plate and capable of sliding towards the first cover plate from the second cover plate or away from the first cover plate to engage or disengage the first cover plate, the flexible assembly and the second cover plate in the open state.

4. The electronic device according to claim 3, wherein the second cover plate has a first positioning portion and a second positioning portion corresponding to the slider, the first positioning portion is disposed farther away from the first cover plate than the second positioning portion, and when the slider is moved to the first positioning portion or the second positioning portion, the slider correspondingly disengages or engages the first cover plate, the flexible assembly and the second cover plate in the open state.

5. The electronic device according to claim 3, wherein the second cover plate has at least one chute corresponding to the slider, and the sliders comprises at least one slide block located in the corresponding at least one chute.

6. The electronic device according to claim 3, wherein the slider has at least one chute corresponding to the second cover plate, and the second cover plate comprises at least one slide block located in the corresponding at least one chute.

7. The electronic device according to claim 1, wherein the positioning assembly comprises a fastening assembly disposed on the first cover plate and the second cover plate in pair for fixing the first cover plate, the flexible assembly and the second cover plate in the closed state.

8. The electronic device according to claim 1, wherein the flexible assembly is a caterpillar track comprising a plurality of track pieces and a plurality of connection members, the connection members are arranged in pairs and correspondingly connect two ends of the track pieces, the first cover plate and the second cover plate respectively, and each connection member is pivotally connected between adjacent two of the first cover plate, the track pieces and the second cover plate.

9. The electronic device according to claim 8, wherein quantity of the track pieces is N, N≥2, the first cover plate and the second cover plate have a first protrusion portion and a second protrusion portion, two ends of each track piece correspondingly have a third protrusion portion and a fourth protrusion portion, the first protrusion portion interferes with the third protrusion portion of the first track piece and stops, the second protrusion portion interferes with the fourth protrusion portion of the $N^{th}$ track piece and stops, the fourth protrusion portion of the $M^{th}$ track piece interferes with the third protrusion portion of the $(M+1)^{th}$ track piece adjacent to the $M^{th}$ track piece and stops, and M and N are positive integers satisfying 1≤M<N.

10. The electronic device according to claim 8, wherein the flexible assembly is bent and sustains at inner side of the flexible display, and the track pieces are segmentally connected between the first cover plate and the second cover plate and respectively contact the inner side of the flexible display.

11. The electronic device according to claim 10, wherein each outer surface of the track pieces has a curvature arc contact surface smoothly contacting the inner side of the flexible display.

12. A limit structure used in a housing having a first cover plate and a second cover plate, the limit structure comprising:
  a flexible assembly bendably connected to the first cover plate and the second cover plate, so that the first cover plate closes on the second cover plate or opens to a limit angle with respect to the second cover plate and then stops, wherein when each component of the flexible assembly rotates to a stop position in the same direction, the flexible assembly limits continuous rotation of the first cover plate with respect to the second cover plate: and
  a positioning assembly disposed on the housing for positioning the first cover plate, the flexible assembly and the second cover plate in an open state or a closed state, wherein when the first cover plate opens to the limit angle, the positioning assembly comprises a slider engaged with the first cover plate and the second cover plate and crossing over the flexible assembly, so that the positioning assembly prevents the first cover plate from rotating in a reverse direction with respect to the second cover plate.

13. The limit structure according to claim 12, wherein the slider is slidably disposed on the second cover plate and capable of sliding towards the first cover plate from the second cover plate or away from the first cover plate to engage or disengage the first cover plate, the flexible assembly and the second cover plate in the open state.

14. The limit structure according to claim 13, wherein the second cover plate has a first positioning portion and a second positioning portion corresponding to the slider, the first positioning portion is disposed farther away from the first cover plate than the second positioning portion, and when the slider is moved to the first positioning portion or the second positioning portion, the slider correspondingly engages or disengages the first cover plate, the flexible assembly and the second cover plate in the open state.

15. The limit structure according to claim 13, wherein the second cover plate has at least one chute corresponding to the slider, and the slider comprises at least one slide block located in the corresponding at least one chute.

16. The limit structure according to claim 13, wherein the slider has at least one chute corresponding to the second cover plate, and the second cover plate comprises at least one slide block located in the corresponding at least one chute.

17. The limit structure according to claim 13, wherein the fixing assembly comprises a fastening assembly disposed on the first cover plate and the second cover plate in pair for fixing the first cover plate, the flexible assembly and the second cover plate in the closed state.

18. The limit structure according to claim 13, wherein the flexible assembly is a caterpillar track comprising a plurality of track pieces and a plurality of connection members, the connection members are arranged in pairs and correspondingly connect two ends of the track pieces, the first cover plate and the second cover plate respectively, and each connection member is pivotally connected between adjacent two of the first cover plate, the track pieces and the second cover plate.

19. The limit structure according to claim 18, wherein quantity of the track pieces is N, the first cover plate and the second cover plate correspondingly have a first protrusion portion and a second protrusion portion, two ends of each track piece correspondingly have a third protrusion portion and a fourth protrusion portion, the first protrusion portion interferes with the third protrusion portion of the first track piece and stops, the second protrusion portion interferes with the fourth protrusion portion of the $N^{th}$ track piece and stops, the fourth protrusion portion of the $M^{th}$ track piece interferes with the third protrusion portion of the $(M+1)^{th}$ track piece adjacent to the $M^{th}$ track piece and stops, and M and N are positive integers satisfying $1 \leq M < N$; $N \geq 2$.

* * * * *